Sept. 23, 1952 V. J. SAWDON 2,611,630
ENVELOPE COMBINATION
Filed March 11, 1949 3 Sheets-Sheet 1
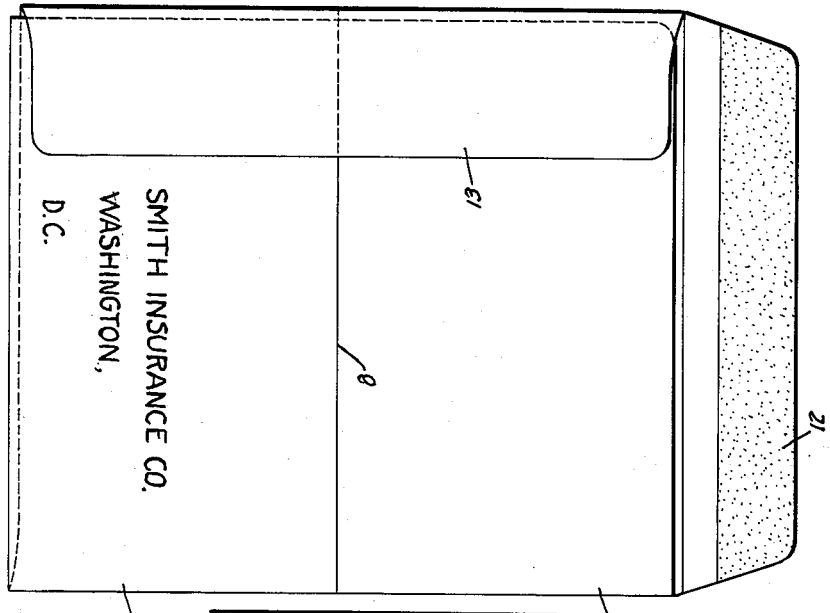
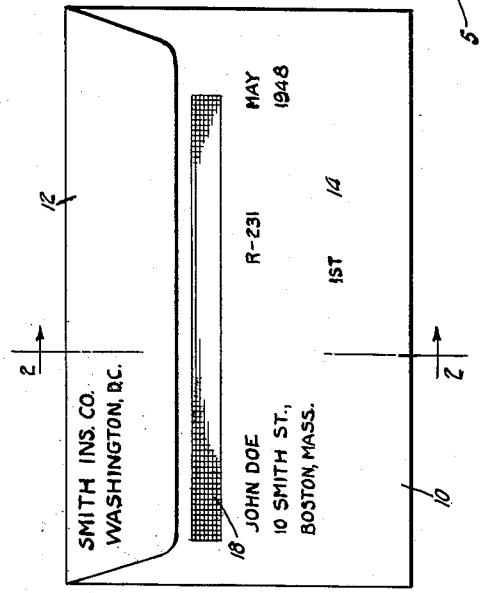
INVENTOR.
Victor J. Sawdon
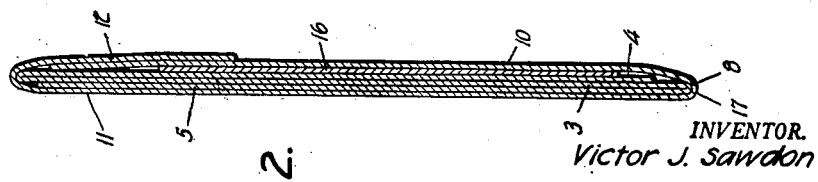
ATTORNEYS Sept. 23, 1952 V. J. SAWDON 2,611,630
ENVELOPE COMBINATION
Filed March 11, 1949 3 Sheets-Sheet 2
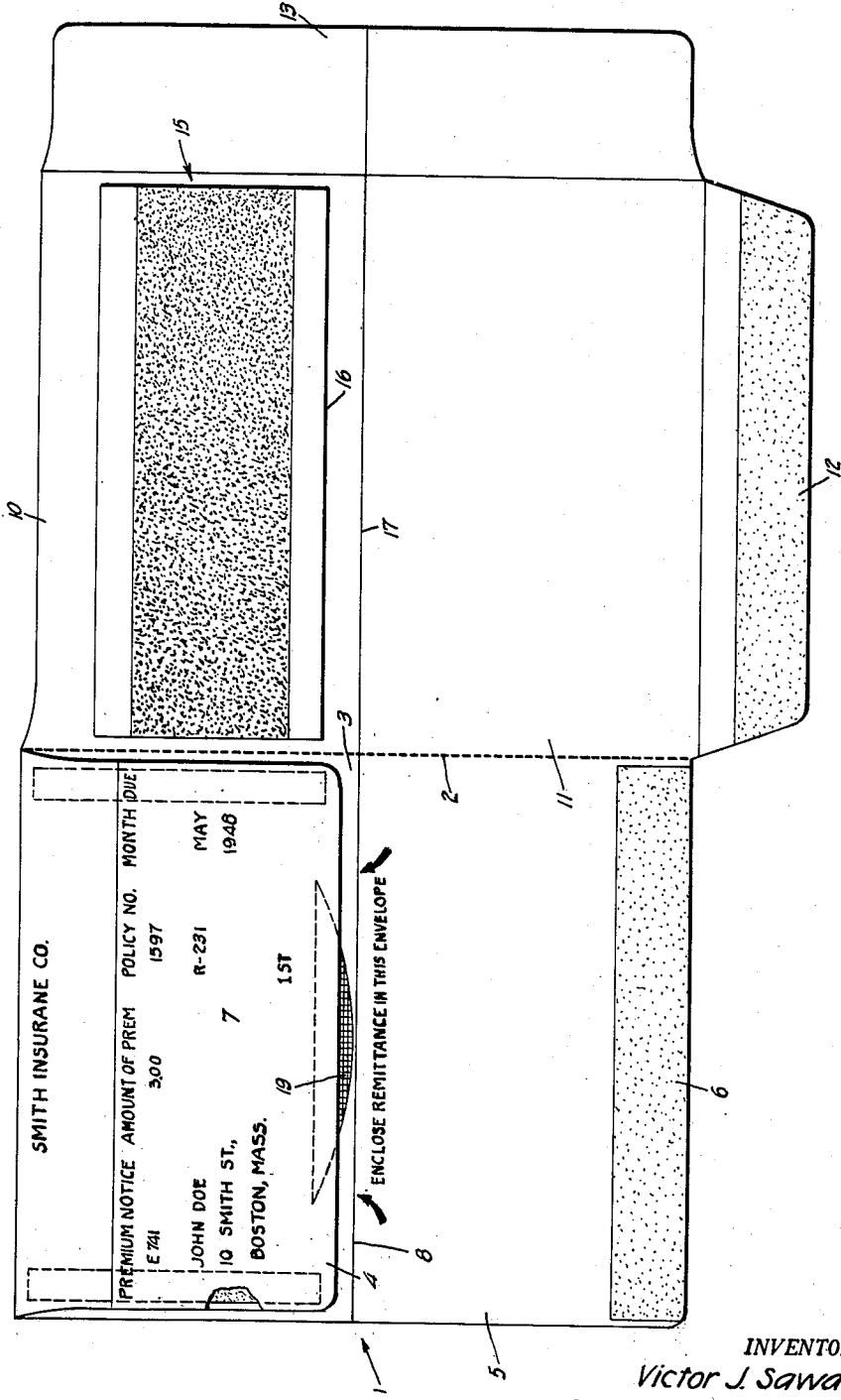
INVENTOR.
*Victor J. Sawdon*
BY
*Moses, Nolte, Crews & Berry*
ATTORNEYS Sept. 23, 1952 V. J. SAWDON 2,611,630
ENVELOPE COMBINATION
Filed March 11, 1949 3 Sheets-Sheet 3
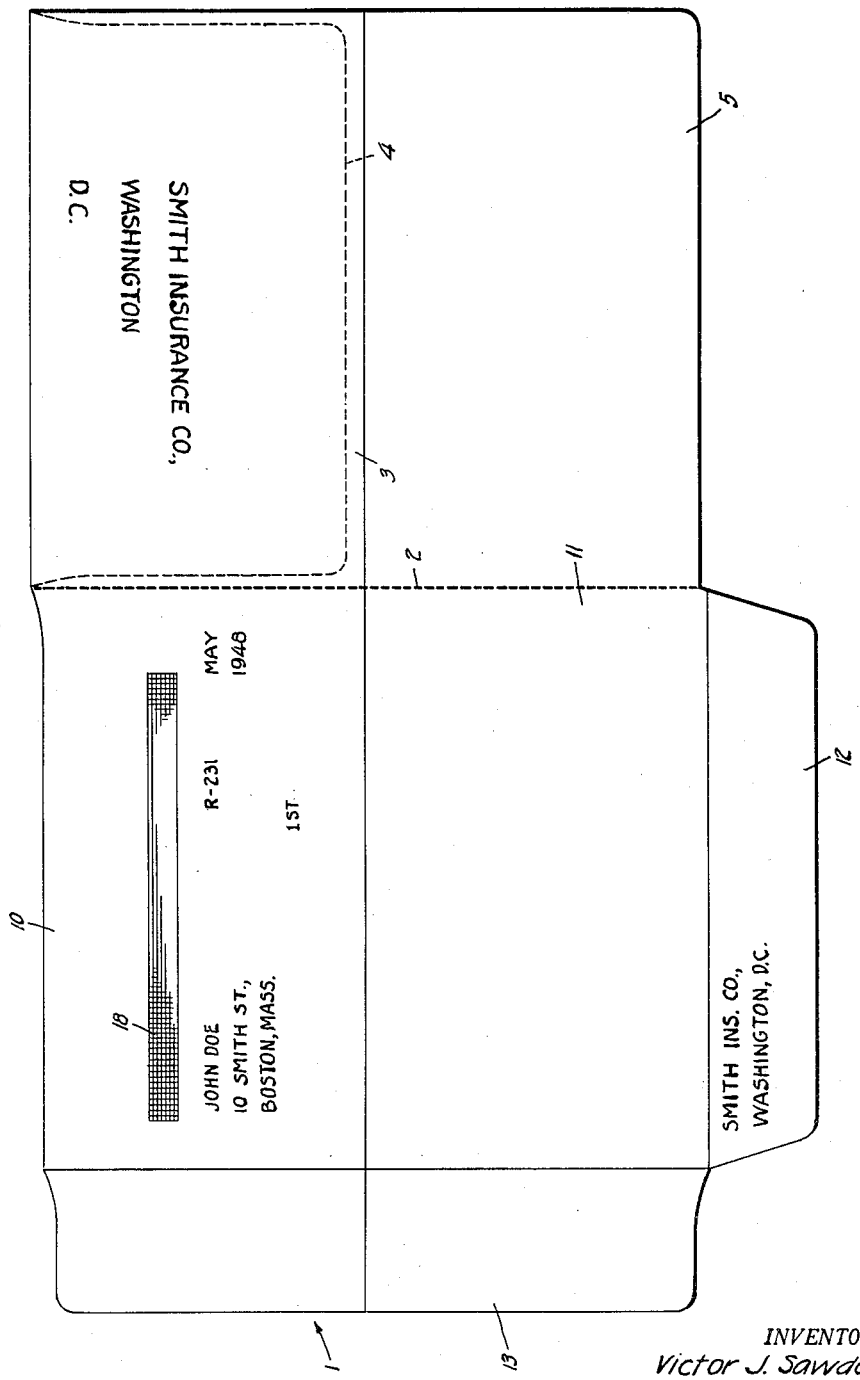
INVENTOR.
Victor J. Sawdon
BY
Moses, Nolte, Crows & Berry
ATTORNEYS Patented Sept. 23, 1952

2,611,630

UNITED STATES PATENT OFFICE 2,611,630

ENVELOPE COMBINATION

Victor J. Sawdon, New York, N. Y.

Application March 11, 1949, Serial No. 80,928

4 Claims. (Cl. 282—25)

This invention relates to notification and return remittance envelope combinations of a kind adapted for use in connection with insurance premiums and any other installment business in which notices of payments due are sent periodically and/or intermittently to the same recipient. For conciseness and clearness, insurance business will be illustratively referred to herein. The invention may be embodied in combinations of an unitary character or in combinations involving two distinct envelopes, the one contained within the other.

It is important in connection with the transaction of business of this kind that a return envelope be provided in which the remittance may be sent and that the return envelope as originally sent out to the insured shall bear upon it a complete identification of the person remitting, his account number, and a statement of the amount due. By this means, the insured is informed or reminded of the amount and can see that his remittance will be properly credited to his account. The insurance company is assured of receiving back with the remittance a correct identification of the account and a correct statement of the amount due, so that it will have immediately at hand the necessary means for checking the correctness of the amount remitted and for crediting it to the proper account. This avoids difficulties which are frequently encountered under other systems, such as remittances of wrong amounts, and remittances illegibly composed, insufficiently identified, or completely unidentified.

The information contained upon the return envelope in the notice area includes the complete name and address of the insured, which may be in a form suitable to constitute the address upon the face of the outgoing, enclosing envelope. The notice, however, also includes confidential matter which ought not to appear upon the face of the outer envelope.

It is very desirable that the address upon the outer envelope shall be applied at a single operation with the printing of the notice on the inner envelope, not only because this saves time and a very substantial expense incident to the necessity of providing and utilizing office machinery and personnel extensively, but also because it assures correspondence of the notice with the address and eliminates all possibility of a notice describing one party and an outside address describing another.

In organizations where these notices have to be mailed out in large quantities, it is desirable to simplify the procedure in every possible way. The comparing of separately written or imprinted matter on the outgoing and return envelopes, the stuffing of envelopes, and the closing and sealing of them can consume a great deal of clerical time and office space and involve a very substantial expense.

It is an object of the present invention to provide a notification and return remittance combination comprising an outer, enclosing envelope having an address area, an inner envelope having a notification area in register therewith, and a transfer medium interposed between said areas and in transferring contact with the latter so that type impressions applied to the address area will be legibly reproduced in the notification area, the outer envelope being sealed before any notice and address are impressed. In other words, the envelope combination, including outgoing and return envelopes, is purchased from the manufacturer by the insurance company in a sealed condition, so that all that is necessary in preparation for mailing the envelopes is the running of them through an addressograph machine or other mechanical addressing device, so as to apply the stencil type forming the complete notice to the address area of the outer envelope.

In order that the confidential portion of the notice shall not appear upon the outer face of the envelope, the outer face may desirably be provided with a blacked out area upon which this confidential matter is impressed. Alternatively, however, the addressograph may be equipped with a ribbon having inked and uninked zones, or it may be equipped side by side with inked and uninked ribbons or with a ribbon narrower than the stencil plate, and a fixed shield of paper or fabric alongside.

It is a feature of the invention that the notice thus applied to the notice area of the return envelope is adapted to be completely covered and sealed when the return envelope is folded and sealed and mailed back with the remittance. It is important, however, that the sealing gum shall not be applied in the notice area, since free access to the notice is necessary for checking the remittance against the notice and for crediting the remittance to the proper account.

Other objects and advantages will hereinafter appear.

In the drawing forming part of this specification:

Fig. 1 is a view of the front of the composite envelope form with the outer envelope sealed and addressed;

Fig. 2 is a sectional view taken upon the line 2—2 of Fig. 1 looking in the direction of the arrows;

Fig. 3 is a view in elevation showing the outer envelope with the inner envelope and the guard flap folded behind it;

Fig. 4 is a view of the inner face of the composite form showing certain matter applied to the notice area which would not in fact be applied until after the form had been completely folded and sealed and Fig. 5 is a plan view of the front of the composite form after the inner envelope pocket has been formed but before the form has been further folded.

The combined envelope form includes an inner envelope portion 1 which is divided from the remainder of the form by a perforated, easy tear line 2. The portion 1 includes a body 3, a back flap 4 which is folded against the body 3 and adhered to it along its end margins, and a sealing flap 5. The sealing flap 5 includes a gummed margin 6.

The back flap 4 includes a notice area 7 upon which various information, including the name and address of the insured, the identification of the premium notice, the amount of the premium, and the policy number, are adapted to be imprinted. When this envelope has been detached from the remainder of the form, and the sealing flap has been folded over and sealed to the back flap, the notice area is completely concealed and completely escapes engagement with the sealing gum. Thus, when the return envelope has been received back by the original sender and has been opened by slitting along the fold line 8 between the sealing flap and the body, the notice can be readily uncovered for checking and posting purposes.

The illustrative envelope form also includes an outer envelope 9 for enclosing the inner one. The outer envelope comprises a front panel 10, a back panel 11, a sealing flap 12, and a guard flap 13. The guard flap 13 constitutes an extension of the front and back panels at their ends remote from the inner envelope portion 1. The closure flap 12 extends along the back panel 11 at the side remote from the front panel 10.

The front panel includes an address area 14 which, in the folded condition of the form, directly overlies a portion of the notice area 7. The inner face of the front panel 10 is provided with a carbonized area which is adapted to overlie and contact the notice area. The carbonized area 15 may be provided by directly depositing transfer carbon upon a portion of the inner face of the front panel 10 or by adhesively applying a sheet 16 of one-time or other carbon to the inner face of the front panel.

In the finished condition of the envelope form the inner envelope portion 1 is folded over along the easy-tear and fold line 2 against the inner faces of the front and back panels of the outer envelope. The guard flap 13 is then folded inward to embrace the margin of the inner envelope which is remote from the easy tear line 2, and the form is then folded along the superposed lines 8 and 17, so as to locate the guard flap at the inside of the folded form. The sealing flap is then folded down against the upper margin of the outer face of the front panel 10 and adhesively united with it.

The envelope is desirably provided upon the outer face of the front panel with a blacked out area 18 for receiving the type impressions which are to produce the confidential portion of the notice. As previously pointed out, however, this blacked out area is not essential, since the employment of a narrow ribbon and a shield in the addressograph machine, or the employment of a ribbon having inked and uninked zones, would serve fully to protect against printing of the confidential material upon the outer face of the front panel 10.

It will be seen that the present envelope combination affords perfect assurance of correspondence between the outside address and the inside notice, provides complete checking and posting data on the return envelope portion, and eliminates all comparing, all collating, all stuffing of envelopes with enclosures, and even the necessity for sealing the envelope by the user.

The outer envelopes can be very economically sealed by machine in the course of their manufacture. In this connection it is a point that the sealing adhesive employed on the sealing flap 12 need not be of the kind which is first dried and later moistened by the user, since the envelope can be and is desirably permanently sealed in the course of manufacture and before it reaches the user.

The face of the inner or return envelope bears the address of the insurance company or other return addressee. The inner and outer envelopes are desirably provided with various printed legends designed to assure the correct use of the form. Legends are also provided directing detachment along the easy tear line 2 and the enclosure of the remittance in the pocket of the inner envelope. The inner face of the body 3 is provided with a mark 19 which projects into view beyond the edge of the back flap 7, to assist in calling attention to the fact that there is a pocket opening at this point. A change of address form is desirably included on the ungummed area of the inner face of the closure flap 5.

I have described what I believe to be the best embodiments of my invention. I do not wish, however, to be confined to the embodiments shown, but what I desire to cover by Letters Patent is set forth in the appended claims.

I claim:

1. As an article of commerce, a notification and return remittance envelope comprising, in combination, an inner envelope having as unitary parts thereof a body, a back flap provided with a clear notice area and cooperating with the body to form a remittance pocket, and a gummed sealing flap divided from the body by a fold line and adapted to be folded over the back flap and sealed in place for return transmission, the sealing flap having an ungummed portion of sufficient area to cover and conceal the entire notice-bearing area, and a folded and sealed but unaddressed enclosing envelope separated from the inner envelope by a fold line and comprising a front panel having a clear address area on its outer face which overlies a portion of the notice area of the inner envelope, and a transfer material on its inner side which covers and contacts said notice area, a back panel, and a sealing flap on the back panel folded around the free edge of the front panel, and adhered to a marginal portion thereof, the construction and arrangement being such that type impressions applied to the front panel of the sealed outer envelope will be reproduced on the notice area of the inner envelope.

2. As an article of commerce, a notification and return remittance envelope comprising, in combination, an inner envelope having as unitary parts thereof a body, a back flap provided with a clear notice area and cooperating with the body to form a remittance pocket, and a gummed sealing flap divided from the body by a fold line and adapted to be folded over the back flap and sealed in place for return transmission, the sealing flap having an ungummed portion of sufficient area to cover and conceal the entire notice-bearing area, and a folded and sealed enclosing envelope separated from the inner envelope by a fold line and comprising a front panel having a clear address area on its outer face which overlies a portion of the notice area of the inner envelope, and a transfer material on its inner face which covers and contacts said notice area, a back panel, a sealing flap on the back panel folded around the free edge of the front panel and adhered to a marginal portion thereof, and a guard flap connected to the front and back panels and folded inward into embracing relation to the free margin of the inner envelope, the construction and arrangement being such that type impressions applied to the front panel of the sealed outer envelope will be reproduced on the notice area of the inner envelope.

3. As an article of commerce, in combination, an inner envelope having as unitary parts thereof a body, a back flap provided with a clear notice-bearing area and cooperating with the body to form a remittance pocket, and a gummed sealing flap divided from the body by a fold line and adapted to be folded over the back flap and sealed in place for return transmission, the sealing flap having an ungummed portion of sufficient area to cover and conceal the entire notice-bearing area, and a folded and sealed enclosing envelope in which the inner envelope is contained, said enclosing envelope including a front panel having a clear address area on its outer face which overlies a portion of the notice area of the inner envelope, and a carbonized area on its inner face which covers and contacts said notice area, the construction and arrangement being such that type impressions applied to the front panel of the sealed outer envelope will be reproduced on the notice area of the inner envelope.

4. In combination, an outer sealed envelope, an inner remittance envelope contained in the outer envelope and including as unitary parts thereof, a body, a back flap and a gummed sealing flap divided from the body by parallel fold lines, and adapted to be adhered to one another, there being a clear notice area on one of them so disposed that it will necessarily be concealed when the flaps are folded together and adhered for the return transmission, a sealed outer envelope having a clear address area disposed to overlie the notice area of the inner envelope, and a transfer medium disposed between said areas and in transferring contact with the notice area for reproducing on the notice area type impressions applied to the address area.

VICTOR J. SAWDON.

REFERENCES CITED

The following references are of record in the file of this patent:

UNITED STATES PATENTS

| Number | Name | Date |
| --- | --- | --- |
| 908,671 | Hocking | Jan. 5, 1909 |
| 1,762,084 | Snyder | June 3, 1930 |
| 2,041,434 | Schram et al. | May 19, 1936 |
| 2,156,142 | Blitz | Apr. 25, 1939 |
| 2,158,528 | Sawdon | May 16, 1939 |
| 2,340,700 | Sawdon | Feb. 1, 1944 |
| 2,368,531 | Erickson | Jan. 30, 1945 |